United States Patent [19]

Schwarz et al.

[11] 3,835,790

[45] Sept. 17, 1974

[54] END ABUTMENTS FOR SLIDING DOORS

[75] Inventors: Wilhelm Schwarz; Henricus Tromp; Winfried Heinz, all of Wilhelmshaven, Germany

[73] Assignee: Fried. Krupp Gesellschaft mit beschrankter Haftung, Essen, Germany

[22] Filed: Apr. 10, 1973

[21] Appl. No.: 349,763

[30] Foreign Application Priority Data
Apr. 21, 1972 Germany............................ 7215206

[52] U.S. Cl................... 105/285, 16/86 A, 49/488, 296/155
[51] Int. Cl................................................ F16f 1/37
[58] Field of Search ....... 16/86 A; 49/488; 267/140, 267/141, 153; 105/285; 296/155; 293/71, 88

[56] References Cited
UNITED STATES PATENTS

| | | | |
|---|---|---|---|
| 3,052,930 | 9/1962 | Mathews............................ | 16/93 R |
| 3,455,546 | 7/1969 | Shanok et al....................... | 267/141 |
| 3,472,546 | 10/1969 | Samuels............................. | 16/86 A |
| 3,677,869 | 7/1972 | Chung et al. ...................... | 267/141 |
| 3,687,440 | 8/1972 | Jarret et al........................ | 267/141 |

*Primary Examiner*—Lloyd L. King
*Assistant Examiner*—Richard A. Bertsch
*Attorney, Agent, or Firm*—Walter Becker

[57] ABSTRACT

An end abutment for a sliding door, especially of a railway freight car, which abutment includes a cellular body of synthetic material having a cross sectionally greater diameter section for insertion into a door frame fitting and also having a cross sectionally shorter diameter section axially projecting from said cross sectionally greater diameter section.

6 Claims, 7 Drawing Figures

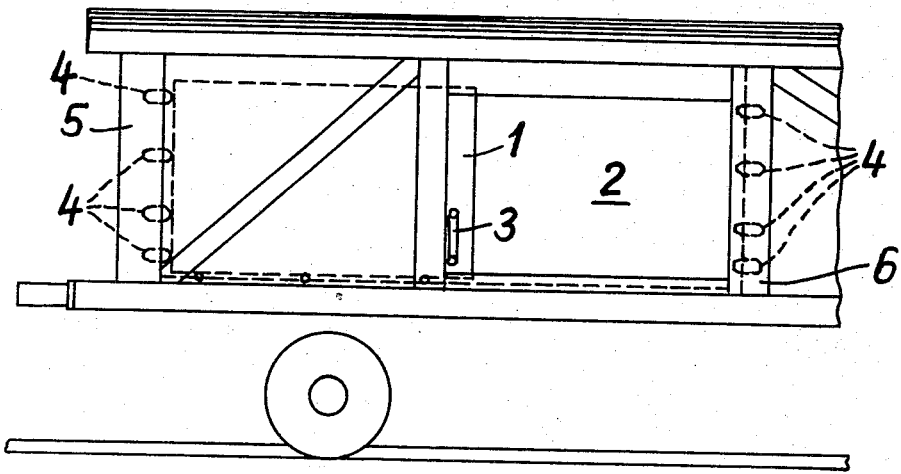
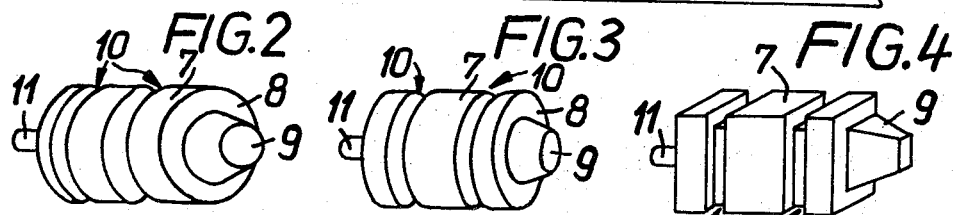
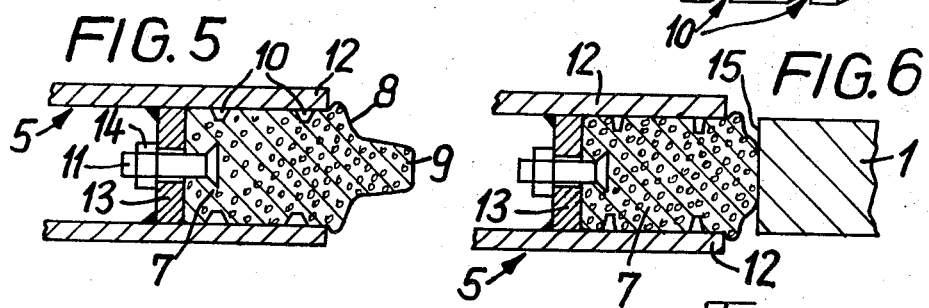
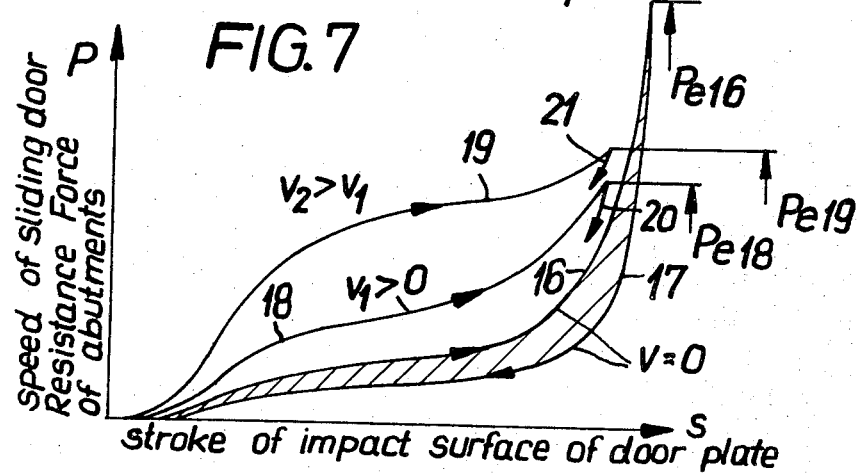

END ABUTMENTS FOR SLIDING DOORS

The present invention relates to end abutments for sliding doors, especially doors for railway freight cars.

In connection with switching operations of railway cars, it sometimes happens that the sliding doors of freight cars are still open when the switching push occurs so that as a result of the retardation or acceleration of the car the doors will hit the end abutments. Inasmuch as the door and car construction can withstand only forces of limited magnitude without permanent deformations, it is necessary that the abutments are designed as shock absorbers for absorbing the shock energy. To this end, heretofore so-called volute buffer springs or helical springs have been employed. Also friction shock absorbers and hydraulic shock absorbers, in other words energy consuming elements, have been used. More recently buffer bodies have been employed which for obtaining a useful characteristic are designed approximately as paraboloid bodies of rotation. Such buffer bodies, however, have the drawback that the cushioning effect is rather low so that the sliding doors are thrown back at almost the same speed at which they impact upon the buffer bodies. Moreover, the work absorbing capability of such end abutments is rather low in conformity with its short available stroke. In comparison with the first mentioned solutions, the maintainance costs for end abutments of rubber are lower, but on the basis of theoretical investigations it must be assumed that unduly high shock forces occur. At least it cannot be concluded that the car construction and the door will not be damaged.

It is, therefore, an object of the present invention to provide end abutments for sliding doors, especially for sliding doors of railway freight cars, which will have a long lift and which will prevent damaging shocks between the sliding doors and the frames pertaining thereto.

This object and other objects and advantages of the invention will appear more clearly from the following specification in connection with the accompanying drawing, in which:

FIG. 1 shows a side view of a portion of a railway freight car with sliding door.

FIGS. 2, 3 and 4 respectively show different embodiments of the end abutments according to the invention, the end abutments being shown in isometric view.

FIGS. 5 and 6 represent horizontal sections through end abutments according to one of the embodiments with a holding construction or a portion of a sliding door in loaded and unloaded condition respectively.

FIG. 7 is a diagram showing the lines of characteristic for the end abutments according to the invention.

The end abutment according to the present invention for a sliding door, especially of a railway car and in particular a railway freight car, is characterized primarily in that the abutment is formed by a body of cellular synthetic material having a stronger portion for insertion into a fitting of the door frame or the door plate and having a weaker portion forming a projection. An end abutment of this type has the advantage that with increasing impact speed, the work absorption of the end abutment will increase, while the end force will decrease with the maximum compression so that also when strong switching shock occur which result in a shocklike closing of the sliding doors, damages will be safely avoided.

Referring now to the drawing in detail, FIG. 1 shows a side view of a railway freight car with a sliding door. According to FIG. 1, in a side wall of a railway freight car there is provided a plate 1 which forms the panel of a sliding door and which is movable between the illustrated open position and the closed position in which the door opening 2 is closed. The door is equipped with a handle 3. Both end positions of plate 1 are limited by end abutments 4 according to the present invention which are inserted into posts 5, 6 of the car wall.

According to FIG. 2, that part of an end abutment which is to be inserted into a post has the shape of a straight circular cylinder 7 which over an only slightly inclined conical surface 8 merges with a weaker projecting part 9 in the form of a truncated cone. The cylindrical part of the end abutment has two annular grooves 10. On that side of the end abutment which is opposite to the projecting part 9 there projects a threaded pin 11.

The end abutment according to FIG. 3 differs from that of FIG. 2 in that its cross sections are not circular but oval, whereas the end abutment according to FIG. 4 has rectangular cross sections.

The end abutments consist of foamed polyurethane.

As will be seen from FIG. 5, the end abutment has its stronger portion tightly fitted into the space between two plates 12 of the post 5. Its rear surface engages a partition 13. The threaded pin 11 is passed through a bore in the partition 13. By means of a nut screwed onto the threaded pin 11 the position of the end abutment is secured in the post 5.

The projection 9 with the slightly inclined conical surface 8 projects beyond the surface 12.

When in conformity with FIG. 6 plate 1 of the sliding door impacts upon the end abutments 4 at high speed, the synthetic foam material is greatly compressed so that the projection 9 almost disappears. In this connection the material of the end abutment absorbs the work corresponding to the kinetic energy of plate 1 so that plate 1 is elastically stopped.

The diagram of FIG. 7 shows for different speeds of impact of plate 1 upon the abutments 4 the course of the resistance force P of the abutments over the stroke $s$ performed by the impact surface 5 of the door plate 1 from the time of impact upon the projection 9 to the point of stopping of plate 1.

When the end abutments are statically loaded without impact velocity, the characteristic lines 16, 17 are obtained. Accordingly, over the major portion of the stroke $s$ only a relatively small amount of work is absorbed by the end abutment which amount of work corresponds to the surface below line 16. Toward the end of the stroke, however, the resistance force P of the end abutment greatly increases. For the subsequent expansion of the end abutment the characteristic line 17 is obtained. The surface between the characteristic lines 16 and 17 is an indication or a measure for the cushioning effect realized by the end abutment.

If, however, as is the case in practice, plate 1 of the sliding door impacts upon the end abutments 4 at a relatively high speed, for instance, the characteristic lines 18 and 19 are obtained. The characteristic line 19 applies when the speed $v_2$ of the compression of the synthetic foam material is considerably higher than the speed $v_1$ of the compression which corresponds to the curve 18. It will be seen that in conformity with the characteristic lines 18 and 19 the end abutment has already shortly after the impact of the sliding door 1 upon the projection 9 a great work absorbing capability. The more the speed of plate 1 is reduced by the end abutments 4, in other words with increasing stroke $s$, the more the characteristic lines 18 and 19 approach the characteristic line 16. Consequently, after the kinetic energy of the moved plate 1 has been absorbed by the compression of the end abutments, which takes place at an end stroke which is somewhat less than at static load, there are obtained considerably lower end forces $Pe_{18}$ and $Pe_{19}$ respectively corresponding to the characteristic lines 18 and 19. Thereafter the absorption shock of the moved door plate 1 is at the pertaining posts 5 or 6 absorbed with relatively low end forces. This means that the posts and thus the structure of the freight car as well as the door plate will not be damaged or deformed and will have a longer life.

FIG. 7 furthermore shows the first parts 20, 21 of the characteristic lines for the expansion of the end abutments following the cushioning of the door plate 1. It will be seen that the characteristic lines which correspond to the expansion of the end abutments are located considerably lower than the characteristic lines 18 and 19. Consequently large surfaces are obtained between these lines 20 and 21 and the lines 18 and 19 which indicates that the work performed during the compression of the end abutments will to a great extent no longer be present as potential energy. Therefore, a high cushioning effect is obtained with the result that a resilient throwing back of the door plates after their impact upon the end abutments will be avoided.

The dependency of the characteristic lines on the speed of compression of the end abutments, as it is evident from FIG. 7, is realized by so treating the synthetic foam material when foaming the same that it will enclose gas bubbles which are uniformly distributed throughout the volume of the foam material.

It is also possible that the end abutments are inserted into the end faces of the door plate 1 and impact upon the corresponding abutting surfaces as, for instance, of the posts 5, 6.

It is, of course, to be understood that the present invention is, by no means, limited to the particular showing in the drawing but also comprises any modifications within the scope of the appended claims.

What we claim is:

1. An end abutment for use in combination with a sliding door movable in a door frame means of railway car having a fitting in alignment with path of movement of the sliding door, especially for a railway freight car, which includes: a cellular body of synthetic material having a cross sectionally greater main section for insertion into the fitting of the door frame means and also having a cross sectionally shorter further section axially projecting from said cross sectionally greater main section.

2. An abutment according to claim 1, in which said projecting cross sectionally shorter further section tapers in axial direction of said abutment in the direction away from said cross sectionally greater main section.

3. An abutment according to claim 1, in which said cellular body has circular cross sections of differing diameter.

4. An abutment according to claim 1, in which said cellular body has oval cross sections having a plurality of diameters.

5. An abutment according to claim 1, in which said cellular body has rectangular cross sections.

6. An abutment according to claim 1, in which said cellular body has gas bubbles substantially uniformly distributed and enclosed therein whereby the resistance force of the end abutment greatly increases with increasing compression speed thereof.

* * * * *